Aug. 25, 1953

C. W. JOHNSON 2,650,109

APPARATUS FOR ALIGNING AND SORTING SHEETS
OF PAPER, ETC., AND PARTS THEREFOR

Filed Dec. 9, 1949

INVENTOR.
CLAUDE W. JOHNSON
BY
*A. Durham Ave.*
ATTORNEY

Aug. 25, 1953  C. W. JOHNSON  2,650,109
APPARATUS FOR ALIGNING AND SORTING SHEETS
OF PAPER, ETC., AND PARTS THEREFOR
Filed Dec. 9, 1949  5 Sheets-Sheet 3

INVENTOR.
CLAUDE W. JOHNSON
BY
ATTORNEY

Aug. 25, 1953   C. W. JOHNSON   2,650,109
APPARATUS FOR ALIGNING AND SORTING SHEETS
OF PAPER, ETC., AND PARTS THEREFOR
Filed Dec. 9, 1949   5 Sheets-Sheet 5

INVENTOR.
CLAUDE W. JOHNSON
BY
ATTORNEY

Patented Aug. 25, 1953

2,650,109

UNITED STATES PATENT OFFICE 2,650,109

APPARATUS FOR ALIGNING AND SORTING SHEETS OF PAPER, ETC., AND PARTS THEREFOR

Claude W. Johnson, Berkeley, Calif.

Application December 9, 1949, Serial No. 132,145

30 Claims. (Cl. 282—1)

This invention relates to an apparatus for aligning as well as for sorting a plurality of sheets of paper or cards and the like, and also to a method for sorting sheets.

Aligning as used herein means bringing into alignment the edges of any plurality of sheets, whether of paper, plastic, metal or other substance. Sorting as used herein means removing from one or more plural sheet sets of forms any interleaved carbon paper or any one or more of the form sheets by means of selectively suspending certain of the sheets on supporting pins and vibrating the sheets by means of said pins.

The invention solves problems relating to the alignment of all types of paper, cards, etc. It also solves problems relating to the sorting of forms according to coded systems of perforations and notches. Such sorting systems are described in the United States Patents to Perkins, No. 1,544,172 issued June 30, 1925, and No. 1,739,087 issued December 10, 1929.

Generally speaking, the forms are perforated at predetermined aligned intervals near an edge, with selected perforations changed into open notches by cutting away the stock between the edge of the sheet and the perforation. The selection for notching is made on a basis of a predetermined code. If a particular form is to be dropped out of the set, a sorting pin or pins is or are inserted which will pass through a common hole or holes in all the forms of the set, except the form that is to be dropped out. The form having a notch or notches in line with the sorting pin or pins will slip out from between the rest of the forms because there is no pin or pins to retain it. Many notching systems have been tried and the present device may be used with any of them. It is probably the only device which enables operators to work speedily and satisfactorily with all forms of notching systems. Its excellence comes from having solved problems heretofore unsolved.

One problem in sorting such punched and notched forms is that careful alignment must precede accurate sorting; and after sorting, the forms usually have to be re-aligned before they can be stapled together, filed, or processed further. Heretofore, the aligning has consumed extra time and has had to be done on a separate apparatus. The present invention provides a single apparatus on which alignment and sorting may be done. It thereby saves time and makes possible greatly increased productivity for each operator. It enables simultaneous re-alignment of some of the forms while others are being sorted, all on one apparatus by the one operator.

Another problem which has made sorting take longer and has caused it to be less accurate is the tendency of the forms, whether of paper or card stock, to resist separation and to stick together. Attempts have been made to solve this problem by moving the sorting pins in a rotary, gyratory fashion. The patent to Brower, No. 2,259,795 issued October 21, 1941 is typical and employs an eccentrically mounted rotating spindle first to shake out the carbon paper from between the sets of forms and then to separate selected sets of forms depending upon which hole in the forms receives the spindle. In use the rotating spindle seems to produce such an abrasive action that it tears the paper. The Sandell Patent No. 2,338,133 issued January 4, 1944, provides a machine which vibrates the forms in a vertical plane while suspended on non-rotating supporting pins and it is an improvement over Brower.

The present invention is an improvement over both the foregoing and among other things provides a method and apparatus by which the separating forces set up by the vibration can be supplemented by a manual force applied to the sorting pins. This is done by having the sorting pins slidably mounted in the vibrating head so that they can be moved apart by hand as soon as the vibration has caused each set of suspended forms to swing into a clear position in respect to those sorting pins on which they are not suspended. This manual separating force is applied to the already vibrating sets of forms.

The invention also provides an apparatus for securing an improved type of vibration. The vibration is almost entirely vertical and is very rapid, so that carbons and other sheets being separated will fall down vertically. Also, there is no rotation of the supporting pins so the holes will not be abraded and torn open.

Another advantage of the slidably mounted supporting pin is that it gives the machine adaptability in separating forms whose holes may be irregularly spaced, either from intention or from inaccurate punching machinery. Previous sorters have lacked this flexibility. They could be used for only one type of code or notching system, and differently set pins in a separate sorter had to be used for each of the many different systems. The present invention also makes provision for the use of sorting pins of different size. Since the pins can be moved toward or away from each other at any time, the spacing can be changed to fit any code and also to compensate for any inaccuracy in the punching.

Another problem solved by the present invention is that of aligning all types of paper and different amounts of paper. In the present invention the paper being aligned by jogging can be supported at different angles to provide optimum conditions for each of the different surface-types of paper. For example, stencil duplicating paper has a very rough surface that makes it slow in jogging into perfectly aligned stacks. It will align most quickly if jogged quite vigorously and while supported vertically or nearly so. Typewriter paper is relatively smooth and is much easier to align. It should be jogged less vigorously and at a flatter angle. So-called slick paper is still smoother and should be jogged still less vigorously and at a still flatter angle. The present invention includes an aligning hopper that can be adjusted to support the paper at almost any angle. Also by shifting its point of attachment to the vibrating deck it can be adjusted so as to change the intensity of vibration to that best suited for the job to be done. No complicated motor speed change mechanism is needed to secure these changes as it is all done by regulating the position of the hopper base blocks on the deck.

Aligning joggers heretofore in use have treated a thin stack of paper the same as a thick stack of paper. This has caused difficulties. Either it has taken too long to jog a thick pile of paper into place, or it has jogged too vigorously for a thin pile. The present invention solves this problem by providing a means for automatically increasing the amount of vibration proportionably to the pile of paper on the hopper.

Another problem which had not been solved up to now has been the provision of a portable jogger that could be used anywhere in an office. Usually joggers have been heavy and have vibrated so much that they required a special table of heavy construction instead of being made light in weight and easily movable from place to place. The present invention provides a resilient mounting for the apparatus so that the jogger can be used on top of any desk in an office. The vibration is effectively dampened through the resilient mounting and very little if any is transmitted through it to the desk. A novel counterbalance saves space and weight and thereby enhances the portability.

The structure that solved these problems includes a resiliently mounted base on which an electric motor is supported, and a deck supported pivotally above the base by a novel form of spring reed hinge. Vertical vibration of one part of the deck is transmitted from an eccentric on a rotating shaft by a novel form of resilient pitman including a spring reed connection which eliminates any substantial horizontal vibration. A shock absorber is also provided for controlling the amplitude of the vibrations of the deck. The vibrated deck supports both the aligning and the sorting apparatus. The sorting apparatus is preferably located along the edges of the deck having the greatest amplitude, and includes a number of removable pins that may be moved into different laterally spaced positions. The aligning apparatus may include the deck and a fence along one or more edges of it and also a tilt hopper which can be varied in its angular position with respect to the deck. The tilt hopper has aligning fences along two of its converging edges. Its lower end is usually secured rigidly to the deck, and its upper end may be supported by a resilient positioning spring reed that automatically compensates for the size of the pile of paper in the hopper. The more paper there is in the hopper the more amplitude the reed will permit the hopper.

In addition to solving the problems which are enumerated above, the invention has many other advantages, several of which will be discussed in the detailed description below and others which will be obvious without discussion. The following description of several forms of the invention is provided in accordance with United States Revised Statutes, section 4888, but is not to be taken as narrowly limiting the invention which is defined in the appended claims. In many cases, changes in specific parts of the device will be obvious to the man experienced in the art.

In the drawings:

Fig. 12 is a fragmentary top plan view of the sorting apparatus looking at Fig. 2 in the direction of the arrow XII. This and succeeding figures show how the apparatus may be used to drop out the carbons from three sets of forms and then to separate the originals, the duplicates, and the triplicates from each other. In Fig. 12 the sheets are shown as they appear at the beginning of the sorting operation when the carbons are being dropped out.

Fig. 13 is a diagrammatic view in front elevation on a reduced scale showing the first stage of the separation operation after the vibration begins, dropping out the carbon paper from between the sheets. The carbon paper is shown falling out from between the copies.

Fig. 14 is a view similar to Fig. 13 showing the next stage in the operation. Here the center sorting pin has been removed, and the duplicate copies are falling down and away from the originals and triplicates. At the same time, the original copies will swing to the left and the triplicate copies will swing to the right.

Fig. 15 is a view on the same scale as Fig. 12, but in front elevation like Figs. 13 and 14 showing the next stage in the sorting operation. The outside sorting pins and their supporting blocks have been moved apart manually to achieve complete separation of the original copies from the triplicate copies.

*The base*

The sorter and aligner, sold in the trade under the trade-mark "Jog-a-Sorter," is supported by a flat base member 10. The base 10 has resilient legs 11 positioned adjacent its corners. Each leg 11 comprises a coil compression spring 12 whose upper end fits in sockets 13 on the lower side of the base and a rubber foot 14 at the lower end of the spring 12. The foot 14 has a flat bottom surface and an aligning nipple 15 extends up into the spring 12. The legs 11 absorb and dampen the vibration from the apparatus so that it can be made portable and can be used on top of an ordinary office desk instead of having to be permantly secured on a special heavy mounting table, as have previous vibrating apparatus.

A housing 17 surrounds the space around and above the base 10 up to within a short distance below the vibration deck 20. The housing 17 enhances the appearance of the apparatus, prevents tampering, and helps keep the motor clean.

*The deck and its mounting*

A vibration deck 20 is supported above the base 10 and transmits the vibration it receives from a motor 60 to the aligning hopper and to the sorter. In the form of the invention shown in Figs. 1 through 4, the deck 20 is pivotally mounted so as to provide a maximum vibration area near its front edge 21 and a minimum vibration area near its rear edge 22. In the form of the invention shown in Fig. 11, the minimum vibration is near its center 23 and both edges 21 and 22 have maximum vibration.

The deck arrangement shown in Figs. 1 through 4 will first be discussed. At the rear, upright support members 25 and 26 are secured by bolts 27 or otherwise to the upper edge of the base 10. Thin flat spring stock members 30 and 31, which will be referred to herein as reeds, are bolted or otherwise secured adjacent the upper end of the support members 25 and 26. The upper ends of the reeds 30 and 31 are secured respectively to anchor blocks 32 and 33 that are fastened rigidly to the lower surface of the deck 20. There is a gap between the anchor blocks 32, 33 and the supports 25, 26. The reeds 30, 31 act somewhat as hinges, and yet their resiliency permits of a small amount of angular displacement between the front of the deck 20 and the rear. The front of the deck can vibrate vertically while the area near the blocks 32, 33 remains almost stationary. Because the reeds 30 and 31 are of a substantial thickness and are positioned along a line parallel to the rear edge 22 of the deck, they seem to minimize any horizontal vibration of the deck.

Figure 3:
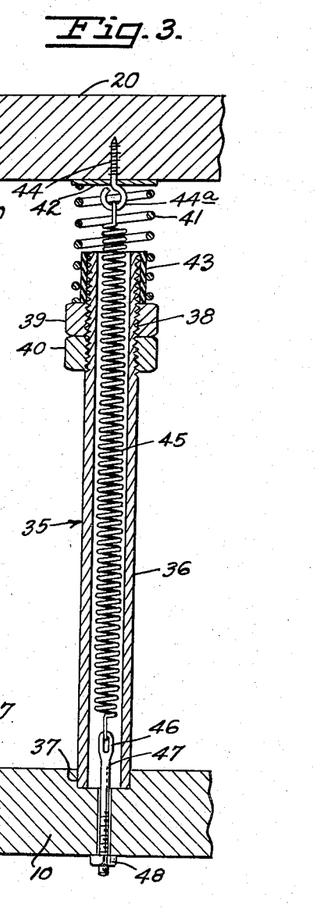
Fig. 3 is an enlarged view in section taken along the line III—III in Fig. 2, showing the compression mounting of the deck above the base.

The front portion of the deck 20 is supported by a novel type of shock-absorbing mounting 35 shown best in Fig. 3. A hollow tubular post 36 is secured in a recess 37 in the upper face of the base 10. The upper end of the deck post 36 is threaded at 38. A nut 39 and a lock nut 40 may be threaded down on the post 36 to provide an adjustable seat for the lower end of a coil-type compression spring 41. The upper end of the spring 41 abuts a wear plate 42 secured to the lower surface of the deck 20. A rubber sleeve or tube 43 may be placed around that portion of the threaded end 38 of the post 36 which projects beyond the nut 39 to prevent the spring 41 from chattering or contacting the threads 38. The nuts 39 and 40 provide a means for adjusting the compression on the spring 41.

Through a hole in the center of the wear plate 42 a screw eye 44 having an eye 44a may be threaded into the deck 20. To the eye 44a is attached the upper end of a coil-type tension spring 45 which extends down through the hollow center of the deck post 36. The lower end of the spring 45 is anchored to the eye 46 of an eye bolt 47 which passes through the base 10 and is held by a nut 48. The tension on the spring 45 may be adjusted by the nut 48 on the bolt 47. By adjusting the nuts 39 and 40 on the deck post and the nut 48 in the base the deck 20 may have its amplitude of vibration snubbed within the range of movement produced by the motor 60 and its drive mechanism.

It will be obvious from the description of the mounting 35 that it permits vibration but dampens and controls the vibration. Upper movement of the deck 20 with respect to the base 10 will be limited and damped by the coil tension spring 45 and movement of the deck toward the base will be damped and limited by the coil compression spring 41. By this means, excessive vibration is avoided and a very high speed of vibration such as 3,000 R. P. M.'s may be used.

The apparatus of Figs. 1 to 4 is so supported by the spring reed hinges 30 and 31 that the rear of the deck 20 will not vibrate any substantial amount, and the maximum vibration will be at the front of the deck, in the vicinity of the mounting 35.

Figure 11:
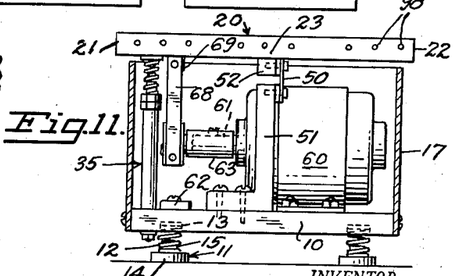
Fig. 11 is a view in side elevation of a modified form of the apparatus with the hopper removed. The support means which hold the deck over the base have been shifted so that there is substantially no vibration in the center of the deck and so there is maximum and about equal vibration at both outer edges. A sorting device is located along all four edges instead of only the front edge of the deck. In this form of the invention the type of pin and pin mounting shown in Fig. 9 has been shown, although the other types of pin and pin mounting could be used as well. This form of device is particularly useful where two operators will wish to use the machine at the same time, and they can work on opposite edges of the deck.

Fig. 11 shows a modified form of the invention, where there is maximum vibration both at the front and at the rear of the deck and minimum vibration is at the center over the reeds 50. This is achieved by having the front deck post 35 positioned as in Figs. 1 to 4 and by having one or more reeds 50 positioned near the center line 23, between and parallel to the edges 21 and 22. The reeds 50 are supported by upright members 51 that may be identical with the upright members 25 and 26. Anchor blocks 52 are secured spaced apart near the center line 23 of the deck 20, and the reeds 50 are fastened to the blocks at their upper ends. The reeds 50 act just like, and may be in all respects identical with the reeds 30 and 31. The vibration over the reeds will therefore be substantially zero, while the front edge 21 and rear edge 22 will be vibrated at the maximum intensity, controlled by the mounting 35.

*The vibrator*

An electric motor 60 may be mounted adjacent the rear edge of the base 10, with its rotating shaft 61 directed toward the front edge. A counterweight or dampener 62 may be secured parallel to the front edge of the base 10 adjacent the deck post 36. The dampener 62 prevents the offset weight of the motor 60 from setting up excessive vibrations and also balances the device as a whole so that it is easier to carry about.

An eccentric adapter sleeve 63 may be provided around the shaft 61 to hold an eccentric shaft 64. The eccentricity of the shaft 64 need not be great; a displacement of about 0.01 of an inch off center will give a total eccentricity of 0.02 of an inch which is quite sufficient for most purposes of this apparatus.

A bearing block 65 is bored and fitted with a ball bearing 66 that encircles the rotating eccentric shaft 64. The bearing block 65 is suspended from the deck 20 by means of a pair of flat springs or reeds 67 and 68 that are secured at their upper ends to an anchor block 69 on the lower face of the deck 20. As the eccentric shaft 64 rotates in its bearing 65, a vertical vibration is imparted to the deck 20 and any substantial horizontal vibrations are dampened and absorbed within the relatively long reeds 67 and 68. Thus in the form of the invention shown in Figs. 1 through 4, the front edge 21 of the deck 20 (which is the one nearest the resilient mounting shown in Fig. 3) will vibrate in a general up and down direction as the motor rotates. Any sidewise vibration is controlled and dampened by the reeds 67 and 68 and by the compression spring 41 and the tension spring 45. The rear of the deck 20 will vibrate very little in comparison to the front of the deck because the reeds 30 and 31 hinge and prevent such vibration. The mounting 35 controls the vibration of the front.

In the form of the invention shown in Fig. 11, the vibration on the deck will be substantially zero near the center line 23, while the front and rear edges 21 and 22 will both have approximately equivalent vibration since they move vertically about the center line 23 as a pivot.

It will be noted that in both forms of the device the planes of the reed hinges 30, 31 and 50 are parallel to the bearing block 65 and perpendicular to the axis of rotation, so that the hinging will be parallel to the axis of rotation. Similarly, the reeds 67 and 68 which transmit the vibration to the deck 20 lie in planes perpendicular to the planes of the reed hinges 30, 31 and 50. This connection, which could be termed a resilient pitman, serves to absorb lateral vibrations and to transmit to the deck 20 only vertical vibrations. The hinge mounting of the deck 20 also means that the deck will vibrate with an action like a door swinging, and this action is very advantageous for aligning sheets as will be seen hereafter. The shock absorbing mounting 35 by means of its two concentrically disposed coil springs 41 and 45 effectively restricts and limits the extent of this swinging action.

*The sorter*

In the form of the invention shown in Figs. 1 to 4, provision is made for the sorter to be mounted along the edge 21 of the deck 20, while in the form of the invention shown in Fig. 11 two or more sorting operations may be carried on at the same time as provision is made for sorting pins to be inserted on all edges of the deck. In either case, the sorters may take any one of several forms. A few forms are shown by way of example in Figs. 5 through 9. The thing that is preferred is a plurality of removable horizontally supported pins arranged so they may be moved apart laterally by manually applied force.

Figures 4, 5, 6, 7, 8, 9:
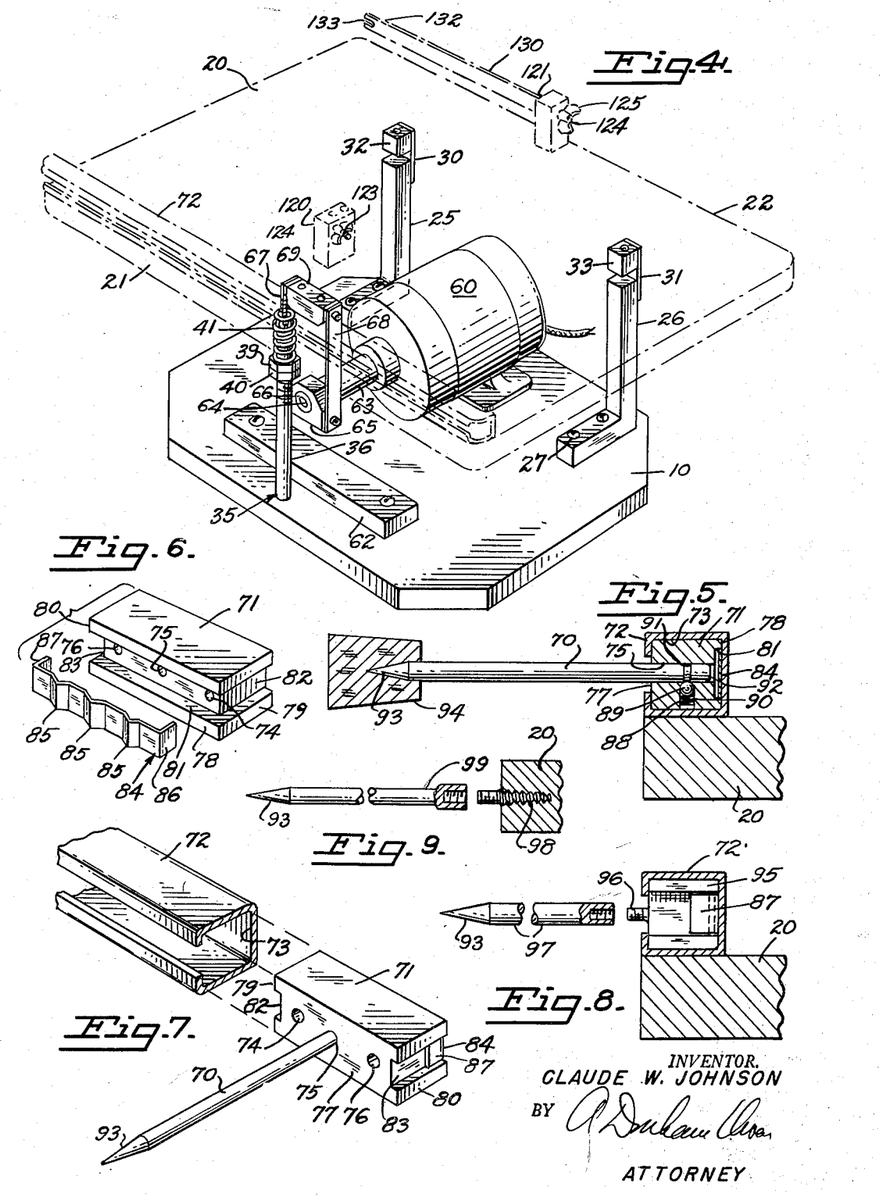
Fig. 4 is a perspective view of the apparatus partially in phantom lines. The deck is shown in dot-dash lines and the removable blocks on which the hopper may be mounted are shown in dotted lines.
Fig. 5 is an enlarged view in side elevation and in section of a sorting pin and its mounting.
Fig. 6 is an exploded view in perspective of one of the pin holding blocks and the leaf spring which helps hold the block in place and yet permits its lateral displacement under manual force.
Fig. 7 is an exploded view in perspective of a sorting pin mounted in its holding block adjacent the pin block holder within which the blocks slide.
Fig. 8 is an exploded view in side elevation and in section, similar to Fig. 5, of a modified form of pin and block.
Fig. 9 is a view similar to Fig. 8 of another modified form of pin which is mounted on studs that are secured directly in the side of the deck.
Figure 10:
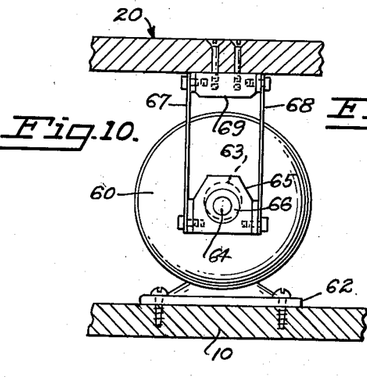
Fig. 10 is a view in front elevation of a portion of the apparatus taken along the line X—X in Fig. 2, showing the connection between the deck and the motor which vibrates the deck.
Figures 22, 23, 24, 25, 26:
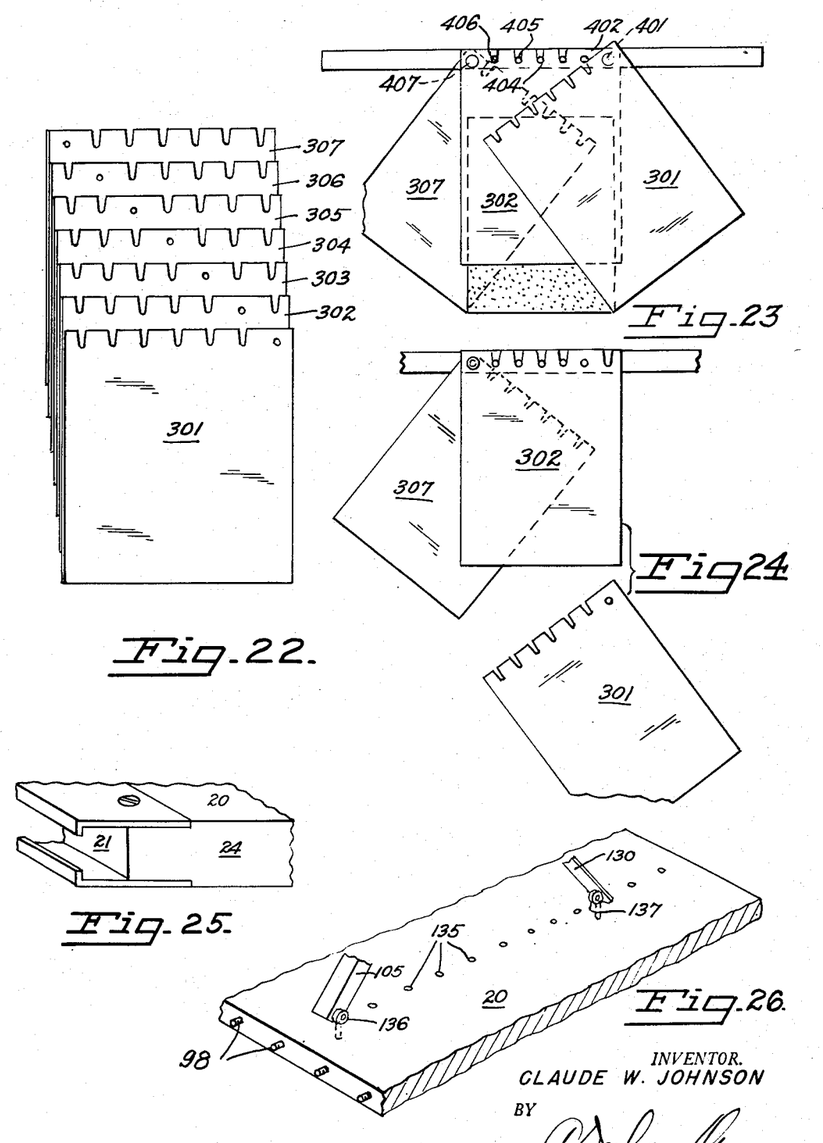
Fig. 22 is a plan view of another series of coded sheets spaced apart vertically to show the notches and perforations. Here there are seven copies each coded differently.
Fig. 23 is a view in elevation showing the sheets of Fig. 22 supported by the seven sorting pins while the carbon paper is being shaken out. During this operation the two forms each suspended by a hole at its outer edge will assume a tilted position as shown in dotted lines.
Fig. 24 is a view similar to Fig. 23 where the pin farthest to the right supporting the original copy has been removed and the original is being dropped out while the other sheets are retained.
Fig. 25 is a view in perspective of one corner of a deck showing a modified form of slot to receive the sliding blocks.
Fig. 26 is a view in perspective of a portion of the deck showing a modified form of attachment means for the hopper.

The sorting pin arrangement shown in Figs. 5 through 7, includes a number of sorting pins 70 each removably mounted in slidable blocks 71. Each block is individually slidable in the pin block holder 72 secured to the upper surface of the deck 20 along its front edge 21. The holder 72 is a rectangular metal member and several sorting pin holding blocks 71 may slide in its interior channel 73. The channel 73 could be made as a flush extension of the deck edge 21 as shown in Fig. 25.

There may be any number of these holding blocks 71. Three are shown in the drawings in Figs. 1 and 12 to 15, but there may be fewer or more of them depending on how many supporting pins are needed for any sorting operation. One block 71 is shown in perspective in Figs. 6 and 7, where it will be seen that it is rectangular and has a plurality of holes 74, 75, and 76 preferably passing from its front through to its rear. Its front face 77 may be substantially planar, but its rear face 78 and its side faces 79 and 80 are preferably recessed to provide grooves 81, 82, and 83.

The groove 81 provides a seat for a leaf spring 84 which is bent to provide a plurality of outwardly extending friction tips 85. The spring 84 is also bent at each end to provide holding tips 86 and 87 that fit into the side grooves 82 and 83 and retain the spring 84 on the block 71. When the block 71 is positioned inside the channel 73 the spring 84 helps it maintain any position to which it is moved manually and prevents it from being shaken out by the vibrations. The spring 84 is not so strong as to prevent intentional manual movement of each block 71 in the channel 73.

The block 71 is also bored in from the bottom at 88 directly beneath the center of each of the pin receiving holes 74, 75, and 76, and a ball detent 89 is urged upwardly into the hole 88 by a small spring 90. The upper ends of the holes 74, 75, and 76 are closed in enough to hold in the ball when a pin is removed. This provides a means for retaining the sorting pin 70 which is grooved at 91 adjacent its inner end 92. When the pin 70 is inserted in any one of the holes 74, 75, or 76 in any block 71, the ball 89 is engaged in the groove 91 by the spring 90 and prevents the pin 70 from accidentally falling out while the apparatus is vibrating. The pin 70 can be removed from the hole by a pull exerted by the operator. An alternative form would be a bayonet type of socket to receive the pin.

Figures 12, 13, 14, 15:
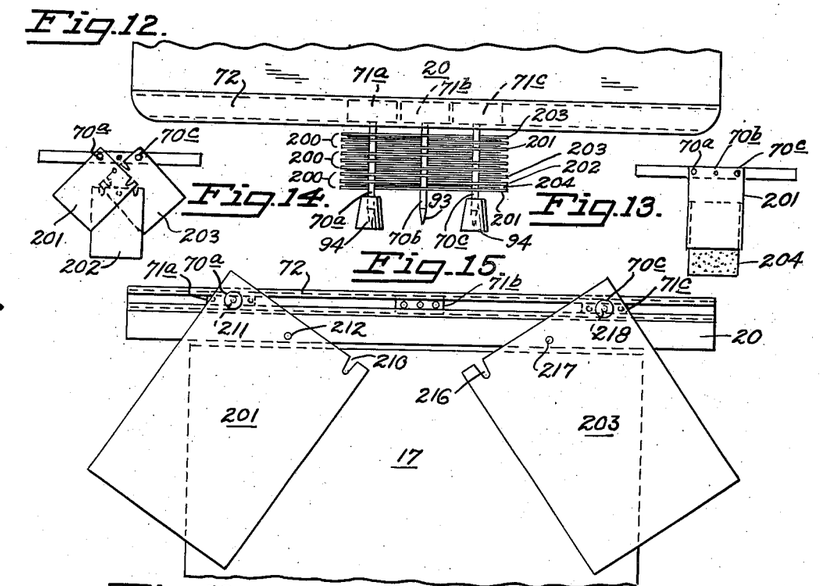
Figure 16:
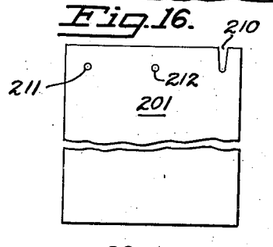
Fig. 16 is a plan view of the type of original used in the above operation, showing one code of notches and perforations. The sheet is broken in the middle to conserve space.
Figure 17:
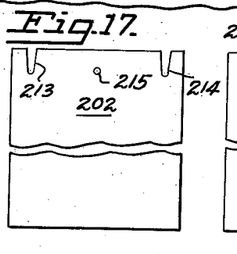
Fig. 17 is a similar view showing the notching and hole on the duplicate copies.

The outer ends of the pins are pointed at 93, so that they can be passed more readily through the perforations in the paper or cards that are to be sorted. Once they are so passed through the cards, paper retainers 94 may be placed over these pointed ends 93 to prevent the sheets from falling off during the sorting. The paper retainers 94 may comprise corks or rubber members or the like, and their sole function is to provide an area larger than the perforations through the paper so that the paper will not be shaken off the pin 70. As shown in Fig. 12, it is not necessary to place a retainer 94 over every pin 70 so long as enough of them are covered to prevent the sheets from falling off.

One advantage of the present invention is that many different sizes of pins 70 can be used in the same apparatus. The shank of the pin may be reduced or enlarged so long as the inner grooved end 92 can be fitted into the blocks provided.

Also the blocks 71 may have more holes in them than the three holes 74, 75, and 76 shown in the drawings, or they may have fewer. In the form shown in the drawings there are three holes spaced one-half inch apart. The blocks 71 may be made longer and have six holes to correspond with some standard types of card sorting apparatus, or a pair of the three hole blocks 71 may be slid together in the channel 73 to achieve the same function as a six hole block.

Any number of blocks may be used and they will all be slidable within the channel. This is an important provision in relation to the method disclosed whereby the operator is able manually to slide apart laterally the pins supporting some of the forms so as to accelerate the separation being accomplished by vibration. There is complete flexibility in this sorting apparatus, a thing which has not been attained by any of the prior art devices where the needle holders are made perfectly rigid and have set positions for the needles. In such devices there is no possibility of compensating for mistakes in the punching or for the use of forms with differently spaced holes and notches.

The present invention will fit any hole and notch spacing and any code and it can be instantly adapted to compensate for any mistake which may have been made or any inaccuracies which may appear in the punching or notching.

Fig. 8 shows a modified form of mounting and a modified form of pin. Here a block 95 is substantially like the block 71, except that it has no holes through it. Instead it has one or more studs 96 projecting from the front and onto one of these may be threaded the female end of the pin 97.

In Fig. 9 a further modification is shown. In this form of the invention blocks and block holders are not used. Instead a threaded stud 98 is screwed directly into the deck and a pin 99 is then threaded onto the stud 98. The pin 99 also is shown with a smaller shank than the pin 97. This type of modification having fixed pin mounting may be used in a lower priced unit where the same hole spacing and notching is to be used, and where there will be no need to use the speed-up method of manually assisting the separation operations by means of the sliding blocks.

Any of these sorters may be mounted along any edge of the deck 20, depending on the deck suspension employed. For example, with the deck suspended as shown in Fig. 11 there may be sorters arranged along the front edge 21, the back edge 22, and along the side edges 24. All of these may be of any of the types described. The type shown in Fig. 9 may be used so that one edge is set up for one code and another edge for another code. In the device of Fig. 11 the front and rear edges will have maximum vertical vibration, while the vibration on the sorting pins mounted on the side edges will vary depending upon how far the pin is located away from the center suspension reeds 50. By having the sorting pins movable and secured around the deck, several operators can be working on the one machine at the same time at a great saving to the employer in equipment cost.

*The aligning hopper and related parts*

Sheets of paper may be aligned by supporting them on one edge directly on the deck 20 where they are held by hand. The rear edge of the block holder 72 may serve as an aligning fence for one vertical edge. When it is so used, one side edge of each sheet of paper may be aligned by the block holder 72 at the same time as its bottom edge is being aligned on the upper surface of the deck 20. The deck 20 will be found especially useful in aligning large sized sheets of paper or large amounts of very rough paper which must be held vertically. The vibration of the deck will jog the paper into place as it is supported loosely in the hands. Since paper with different surface textures will slide on adjacent sheets at different speeds, and since the smoother the surface of the paper the less jogging is needed to accomplish alignment, the operator can select that part of the vibrating deck 20 which has the right amplitude of vibration to accomplish the alignment without too violent a jogging of the paper.

Figure 1:
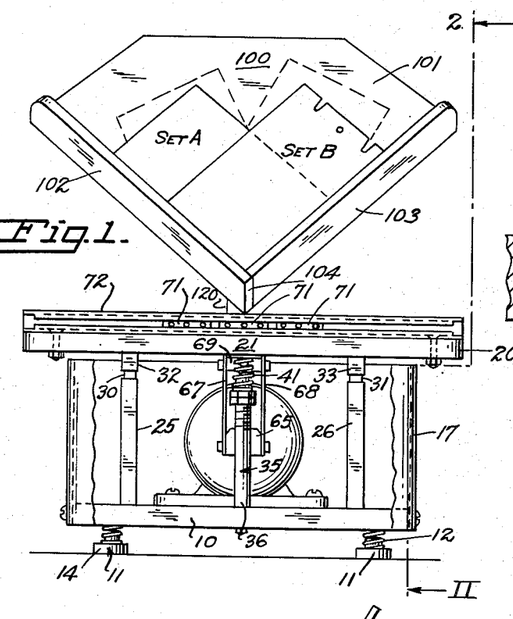
Fig. 1 is a view in front elevation of an apparatus embodying the principles of the invention. Part of the housing has been broken away. The aligning hopper is shown adjusted to an angular position, and two sets of forms which have been aligned are shown in the hopper in solid lines, while in dotted lines are indicated some of the positions of individual sheets before the alignment was completed.
Figure 2:
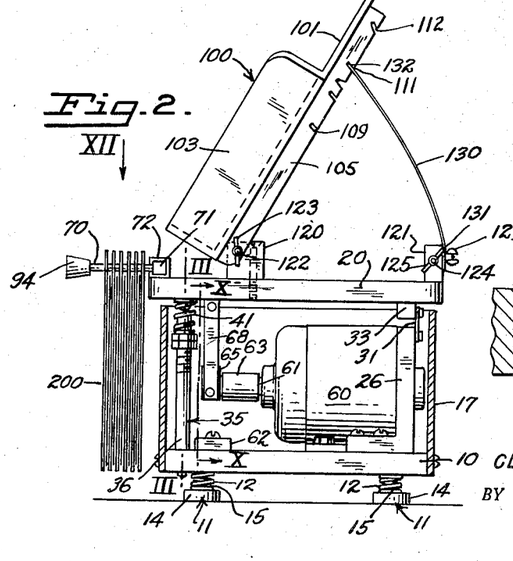
Fig. 2 is a view in side elevation and partly in section of the apparatus taken along the line II—II in Fig. 1. A number of sheets are shown positioned on the sorting pins preparatory to being sorted.
Figure 19:
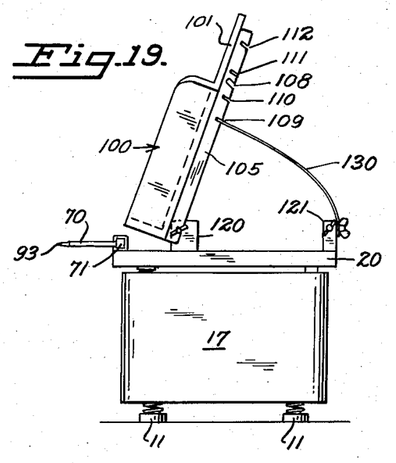
Fig. 19 is a view in side elevation similar to Fig. 2, but with the housing shown in place and showing the tilt hopper arranged in a different angular position to compensate for a different type of paper.

In jogging forms or smaller sheets to align them, I find that it is preferable to use a tilt hopper 100 which may be positioned either horizontally above the deck 20 (Fig. 20), or it may be positioned at various angles (Figs. 1, 2, 19).

Figure 20:
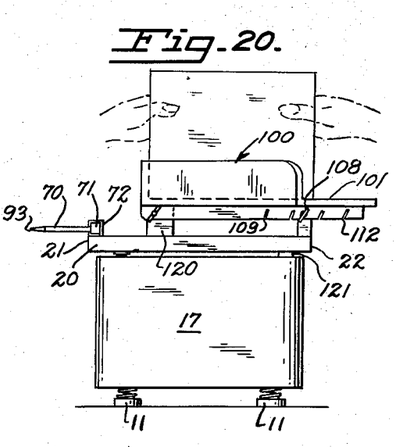
Fig. 20 is a view in side elevation similar to Fig. 19, showing the tilt angle hopper placed in horizontal position for aligning a larger amount of paper supported against one edge of the hopper.
Figure 21:
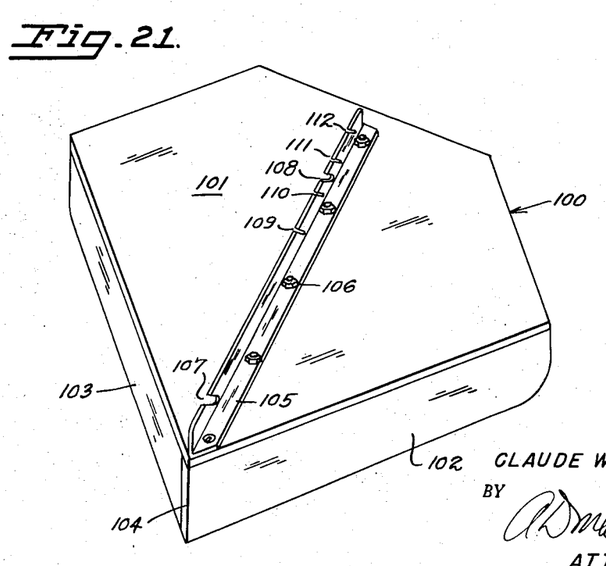
Fig. 21 is a view in perspective of the bottom of the hopper.

The hopper 100 includes a base member 101, preferably shaped substantially as shown in the drawings, and a pair of aligning fences 102 and 103 that converge at 104. When used in all but the horizontal position, the paper lies parallel with the base 101 and two of the sheets edges will move until they come against the aligning fences 102 and 103. When used in the horizontal position the paper is supported vertically by hand against one fence 102 as shown in Fig. 20. The jogging is accomplished the same as described above where it is held directly on the deck 20.

On the bottom of the hopper 100 is a positioning piece 105 (see Figs. 2, 19, 20, and 21) which may be an aluminum angle member secured to the base member 101 by bolts 106. A pair of large notches 107 and 108 are provided and several smaller notches 109, 110, 111, and 112 are also provided. The use of these notches is explained below.

The front edge of the hopper 100 (the one near the convergence 104) is shown supported on a front block 120 secured to the upper surface of the deck 20 adjacent the front edge 21 of the deck 20. A rear block 121 is similarly secured adjacent the rear edge of the deck. The front block 120 has a stud 122 mounted on one side. The forward notch 107 on the hopper 100 fits over the stud 122 and is held in any desired angular position by a wing nut 123. The rear block 121 includes a similar stud 124, and the rear notch 108 of the positioning piece may be placed around the stud 124 and held by a wing nut 125 so that the hopper 100 may be positioned horizontally over the deck as shown in Fig. 20.

The hopper will be positioned horizontally only for stacking very rough paper or large amounts of paper or as a substitute for taking the entire hopper apparatus off the deck 20 and using the deck 20 itself.

Normally it is advisable to use the tilting hopper 100 in a tilted position (see Figs. 2 and 19) and for this purpose the rear block 121 is threaded to receive a wing bolt 127. A long flat spring or positioning reed 130 may thus be secured to the block 121 by the wing bolt 127. The unsecured end 132 of the positioning reed is slotted at 133 (Fig. 4) so that it may embrace the rib 105 when it is placed in any one of the notches 109, 110, 111, or 112. The particular notch chosen will determine the tilt angle of the hopper 100. In Fig. 2 the reed 130 is placed in notch 111 so the hopper 100 is inclined at a flatter angle than in Fig. 19, where the reed is placed in the notch 109. The reed 130 provides resilient support for the tilted hopper. In all cases the reed 130 will be flexed somewhat outwardly and this has the effect of automatically compensating for the amount of the paper in the hopper. As the amount of paper increases it causes the reed 130 to flex more and this gives the hopper more vibration at its upper end. When the amount of paper is reduced, the reed 130 tends to flex less and so springs back to a position where there is less vibration in the hopper. This provides a means for automatically giving the hopper the intensity of vibration needed to jog the sheets into alignment, for as the amount of the paper in the hopper increases, the inter sheet friction increases and more vibration is needed.

Preferably the rear block 121 is stationary while the front block 120 is adjustable forward and back along the deck so that the amplitude of the vibrations affecting the hopper 100 may also be varied. The nearer the front block 120 is to the forward edge of the deck, the greater will be the intensity of vibrations imparted to the hopper 100, and the nearer it is to the reed mountings 30 and 31 the smaller will be the intensity of vibrations imparted to the hopper. In this manner the intensity of vibrations may be adjusted to suit different types of paper.

Instead of using the blocks 120 and 121 to secure the hopper to the deck, the deck (Fig. 26) may have a series of threaded holes 135 spaced on a line between the outer edge of the deck and the back of the deck. The lower end of the tilting hopper 100 has a threaded stud 136 hinged to it and adapted to engage in any one of these holes. By having the threads a snug fit the vibration of the deck will be transmitted to the hopper without any appreciable loss. The lower end of the reed 130 likewise has a threaded stud 137 hinged to it. This stud may be inserted in any appropriate hole to position the reed 130 so it will support the back end of the hopper as desired.

Operation

The first step in sorting paper is usually to jog it to align the edges. For this purpose a loose, non-compacted stack of paper may be placed in the hopper 100. The hopper will have been set on the correct position on the deck 20 to give the proper amplitude of vibrations. Also the reed 130 will have been put in the proper notch 109, 110, 111, or 112. When the motor 60 is energized, its shaft 61 rotates, and the eccentric 64 on the end of the shaft 61 rotates inside its bearing 66. This rotation lifts the bearing block 65 up and down vertically. Its sidewise movement is absorbed by the reeds 67 and 68. The reeds impart the vertical movement to the deck 20 while damping out the horizontal movement. Since the front edge of the deck 20 is adjacent the compression mounting shown in Fig. 3, these vibrations will be limited in their amplitude. The tension spring 45 limits the upward movement of the deck, and the compression spring 41 limits the downward movement of the deck 20. The reeds 30 and 31 secured under the back of the deck act like a hinge and limit the vibration at the rear of the deck 20 to a minimum. They also help to prevent any horizontal vibration, because they lie in a plane perpendicular to the planes of the reeds 67 and 68. This is the operation of the resilient pitman by which the deck 20 is vibrated.

With the motor 60 rotating and vibrating the deck 20 and the hopper 100, sets of paper may be placed in the hopper as desired. Two edges of each sheet will come to rest against the aligning fences 102 and 103. Any number of sets of paper may be placed in the hopper. In sorting forms sometimes alternate sets are crisscrossed like sets A and B in Fig. 1 so that the sets can be kept separate for a future operation.

The method

Figure 18:
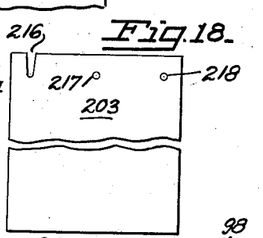
Fig. 18 is a similar view showing the notching and holes on the triplicate copies.

The new speed-up method of sorting will now be described in connection with a typical set of forms illustrated in Figs. 12 through 18. Here is shown a number of sets of forms 200 each set comprising three members, an original 201 (Fig. 16), a duplicate 202 (Fig. 17), and a triplicate 203 (Fig. 18). The original 201 has a notch 210 adjacent its upper right hand corner and perforations 211 and 212 at the center and the left hand corner. The duplicate 202 has notches 213 and 214 adjacent both corners and a perforation 215 in the center. The triplicate copy 203 has a notch 216 near the left hand corner and perforations 217 and 218 at the center and at the right hand corner. As the sets come from the aligning hopper, each set still is interleaved with carbon paper 204, but the carbon paper does not extend up as far as the perforations or notches.

The first step is to insert the pins 70a, 70b, 70c in their separate blocks 71a, 71b, and 71c and then to slide the pins so they line up with the three holes in the forms. Then the sets of forms are slipped onto the pins 70a, 70b, 70c shown in Fig. 12. Retainers 94 are placed over the pointed ends 93 of the pins 70a and 70c.

Fig. 12 shows the position of the forms before any vibration has been applied. Three sets of three sheets 201, 202 and 203 each are shown with the carbon paper 204 still between them.

When the deck 20 is vibrated, the pins 70a, b, and c start vibrating. Fig. 13 shows what happens first. The carbon paper 204 is shaken loose and falls out the bottom and is disposed of.

Next the duplicate copies 202 are to be removed. This is started by pulling out the center pin 70b on which they are being supported. With the pin 70b removed, the vibration will cause the duplicate copies 202 to fall straight down as shown in Fig. 14. While the duplicate 202 is being shaken out, the original copy 201 swings to the left on the pin 70a, and the triplicate copy 203 swings to the right on the pin 70c. As soon as the operator notices that the forms 201 and 203 have swung down far enough to clear the notch 210 from the pin 70c and to clear the notch 216 from the pin 70a, the separation of the forms 201 and 203 can be speeded up by the operator moving the blocks 71a and 71c apart manually. Fig. 15 shows the forms 201 and 203 at the end of this manual lateral separation of the pins 70c and 70a accomplished while the vibration was still being applied to the forms. A substantial saving in time results over having the operator have to wait for vibration alone to drop the forms 201 and 203 into the position shown in Fig. 14.

When the duplicate copy 202 falls out the bottom it is caught and placed in the aligning hopper 100. Then the original 201 or triplicate 203 is removed from its respective supporting pin and is placed in the hopper 100 in a criss-cross position. The third set of forms is similarly treated, being criss-crossed with the second set. If these papers are to be stapled they may be removed from the sorting hopper already aligned and ready for stapling, or they may be filed or otherwise processed.

Figs. 22 to 24 show another type of sorting with a larger number of sheets where a different code is used for the notching. Here each sheet has one perforation and all the rest of the positions are notched. Fig. 22 shows seven sheets 301 through 307, each one having a single perforation at a different location and notches at the location where the other sets are perforated. When a number of sets are placed on the sorting pins as shown in Fig. 23 and the sorter is vibrated, the carbon paper 310 drops out first. While the carbon is falling out, the sheet 301 suspended on the pin at 401 and the sheet 307 suspended on the pin 407 will fall into the dotted line positions shown in Fig. 23.

Any one set of sheets may now be shaken out as shown in Fig. 24 by removing the pin which is passing through the hole in those sheets. The pins have been numbered 401 to 407 to correspond in number with the sheets which they hold. Thus removal of the pin 401 in Fig. 23 allows the sheets 301 to drop out as they are vibrated. Removal of pin 407 will drop out the form 307. When the pin 401 is removed this will allow the form 302 to tilt on its perforation on pin 402. The same is true when the pin 407 is removed, as this will allow the form 306 to tilt on its perforation on pin 406. By working in from the outside edges removing a pin at a time, the forms tilt and get into a position of minimum friction so they drop out more quickly when their supporting pin is removed.

I claim:

1. An apparatus for jogging that may be used for aligning the edges of sheets of paper and the like and for sorting sheets classified by a series of notches and perforations, including a base member; upright members mounted on said base member; collinear vertical spring reed members secured to and projecting above said upright members; a deck held above said base member by said reed members so that said deck may hinge on and along the line of said reeds; a motor mounted on said base member and having a rotating shaft projecting therefrom with an eccentric mounted on said shaft; a bearing block having a bearing adapted to receive said eccentric; and a resilient connection to transmit the vertical force of vibration from said eccentric through said bearing block to said deck, said connection including a pair of vertical spring reeds connecting said bearing block to said deck, said reeds being mounted in planes perpendicular to the plane of said hinge reed members.

2. An apparatus for jogging that may be used for aligning the edges of sheets of paper and the like and for sorting sheets classified by a series of notches and perforations, including a base member; upright members mounted on said base member; collinear vertical spring reed members secured to and projecting above said upright members; a deck held above said base member by said reed members so that said deck may hinge on said reeds; a motor mounted on said base member and having a rotating shaft projecting therefrom with an eccentric mounted on said shaft; a bearing block having a bearing adapted to receive said eccentric; a resilient connection to transmit the vertical force of vibration from said eccentric through said bearing block to said deck, said connection including a pair of vertical spring reeds connecting said bearing block to said deck, said reeds being mounted in planes perpendicular to the plane of said hinge reed members; and a vibration-damping-and-limiting mounting comprising a coil-type tension spring between said deck and said base positioned adjacent said resilient connection and a coil-type compression spring between said deck and said base concentric with said tension spring.

3. An apparatus for jogging that may be used for aligning the edges of sheets of paper and the like and for sorting sheets classified by a series of notches and perforations, including a base member; upright members mounted on said base member; collinear vertical spring reed members secured to and projecting above said upright members; a deck held above said base member by said reed members so that said deck may hinge on said reeds; a channel member formed along one or more edges of said deck; a plurality of blocks supported by said channel member for free sliding movement therein; a plurality of sorting pins insertable in said blocks; a motor mounted on said base member and having a rotating shaft projecting therefrom with an eccentric mounted on said shaft; a bearing block having a bearing adapted to receive said eccentric; and a resilient connection to transmit the vertical force of vibration from said eccentric through said bearing block to said deck, said connection including a pair of vertical spring reeds connecting said bearing block to said deck, said reeds being mounted in planes perpendicular to the plane of said hinge reed members.

4. An apparatus for aligning the edges of sheets of paper and the like, including a base member, upright members mounted on said base member, collinear vertical spring reed members secured to and projecting above said upright members, a deck held above said base member by said collinear reed members so that said deck may hinge on said reed, a motor mounted on said base member and having a rotating shaft projecting therefrom, an eccentric mounted on said shaft, a bearing block having a bearing adapted to receive said eccentric, a resilient connection to transmit the vertical force of vibration from said eccentric through said bearing block to said deck, said connection including a pair of vertical spring reeds connecting said bearing block to said deck, said reeds being mounted in planes perpendicular to the plane of said collinear hinge reeds.

5. The apparatus of claim 4 in which said base is supported by resilient, vibration absorbing legs each said leg comprising a cylindrical coil compression spring positioned in an opening on the lower side of said base and a rubber foot member having an upwardly extending nipple portion that fits into the lower end of said spring.

6. A method of separating cards having systems of notches and perforations including supporting said cards on pins through the positions having perforations, vibrating said pins and at the same time manually moving apart laterally some of said pins that support some of the cards from other pins so as to achieve a sidewise separation of some sheets from others.

7. A method of separating cards having systems of notches and perforations including supporting said cards on pins through the positions having perforations, vibrating said pins and simultaneously removing one or more pins, and then while maintaining the vibration manually sliding apart laterally some of said pins that support some of the cards from other pins so as to achieve a sidewise separation of some sheets from others.

8. A pin-sorting apparatus for sorting sheets having classifying notches and perforations, including a block-supporting member, blocks freely slidably mounted on said member, sorting pins held by said blocks, and means to vibrate said block-supporting member.

9. A pin-sorting apparatus for sorting sheets classified by a series of notches and perforations, including a channeled block-supporting member, blocks freely slidable in the channel of said member, and sorting pins held by said blocks.

10. The apparatus of claim 9 in which each block has means to threadably engage a sorting pin, whereby one or more pins may be removably secured to each block.

11. The apparatus of claim 9 in which each block has one or more openings in which the base of a pin may be inserted and means for removably retaining said pin in said opening.

12. The apparatus of claim 11 in which the means for retaining the pin includes a groove around said pin, and a ball spring urged into said opening so as to engage the groove of said pin.

13. The apparatus of claim 9 in which said block is grooved to receive a leaf-type spring means that serves to prevent accidental displacement of said block in said channel.

14. The apparatus of claim 13 in which said spring means comprises a leaf spring having friction contact areas.

15. A sorter for separating a plurality of forms in which each different form is provided with a supporting hole or holes arranged in different combinations from the others, including in the sorter a vertically vibrating member, a plurality of block members each horizontally freely slidable on said vibrating member, removable pin means engageable with each block member and passing through aligned holes in the forms, and means for vibrating said vibrating member.

16. A sorting pin for an apparatus by which sheets are sorted according to an arrangement of notches and perforations on said sheets, said pin having one end pointed and its other end recessed and interiorly threaded to receive an exteriorly threaded supporting member.

17. An apparatus for sorting sheets which are classified by a system of notches and perforations, comprising a base member, threaded studs supported by said base member and projecting therefrom, and sorting pins having a pointed outer end and an interiorly threaded inner end adapted to threadably engage said studs.

18. An apparatus for holding sorting pins on a supporting member, including a stud having means for securing it to said supporting member and a threaded portion adapted to project outwardly therefrom and to engage a threaded recess in the end of a sorting pin.

19. An apparatus for vibrating stationary and the like including in combination a base; a deck; linear reed spring means connecting said base to said deck, said means being aligned to form a linear spring hinge about which said deck may swing relative to said base and may also move forward and back horizontally; a motor secured to said base; and means connected to said deck at a locus spaced away from said hinge connection and operated by said motor for imparting a vertical reciprocating movement to the part of said deck where it is connected, whereby said deck is swung up and down about its hinge.

20. The apparatus of claim 19 with said spring reed means positioned adjacent one edge of said deck and with said vertical movement-imparting means connected to said deck adjacent its opposite edge.

21. The apparatus of claim 19 with said reed spring means positioned along substantially the center line of said deck and with said vertical-movement-imparting means connected to said deck near one of the edges which is parallel to the hinged center line.

22. An apparatus for vibrating stationary and the like including in combination a base; a deck; linear reed spring means connecting said base to said deck, said means forming a linear spring hinge about which said deck may swing relative to said base and may also move forward and back horizontally; a coil-type tension spring connected at one end to said deck and at its other end to said base adjacent said movement-imparting means; a coil-type compression spring concentric with said tension spring and also connected at one end to said deck and at its other end to said base; a motor secured to said base; and means connected to said deck at a locus spaced away from said hinge connection and operated by said motor for imparting a vertical reciprocating movement to the part of said deck where it is connected, whereby said deck is swung up and down about its hinge.

23. An apparatus for vibrating stationary and the like, including in combination a base member; a deck supported above and generally parallel to said base member; collinear vertical spring reed hinge means forming a linear hinge connection between said deck and said base; power means secured to said base; and a pair of parallel vertical reed spring members connected to said power means and to said deck along planes perpendicular to said collinear hinge means and spaced therefrom for transmitting substantially vertical vibration from said power means to the locus of the deck where they are secured, so that the deck is swung about said reed spring hinge means by said vibration.

24. The apparatus of claim 23 in which said base member is supported on a plurality of vibration absorbing legs, each leg comprising a coil-type cylindrical compression spring secured to the lower side of said base and a foot member of resilient material having an upwardly projecting portion that extends into its said spring.

25. The apparatus of claim 23 in which there are sorting pins supported by members that are mounted on said deck for free sliding movement with respect thereto.

26. An apparatus for vibrating stationary and the like, including in combination a base member; a deck supported above and generally parallel to said base member; a channel member along at least one edge of said deck; a plurality of blocks mounted for free sliding movement in said channel member, each said block having means for removably supporting sorting pins therein; collinear vertical spring reed hinge means forming a hinge connection between said deck and said base; power means secured to said base; and a pair of parallel vertical reed spring members connected to said power means and to said deck along planes perpendicular to said collinear hinge means and spaced therefrom for transmitting substantially vertical vibration from said power means to the locus of the deck where they are secured, so that the deck is swung about said reed spring hinge means by said vibration.

27. The apparatus of claim 23 with an aligning hopper supported by said deck, said hopper comprising a flat member with fences along two of its converging edges, the said hopper being mounted rigidly with respect to said deck at a point adjacent the corner toward which said edges converge and adjacent the vibration-imparting reed members, said hopper being resiliently supported at a point spaced away therefrom by a flexible reed-type spring that is secured to said deck adjacent said reed hinge means, the broad surface of said flexible reed-type spring being generally parallel to said hinge means.

28. The apparatus of claim 27 in which said flexible reed-type spring is adjustable along the axis of said hopper for tilting the hopper at various angles to said deck.

29. The apparatus of claim 28 in which the rigid securing of the hopper to the deck includes a block whose position is adjustable along the deck so that any degree of vibration up to that of the vibration-imparting members may be obtained.

30. A jogger for aligning sheets, including in combination a platform; means to vibrate said platform vertically; an inclined hopper having converging sections along two adjacent sides that meet at the low end of said hopper; means for securing said hopper to said platform rigidly at the low point of said hopper; and a resilient supporting means extending from a raised portion of said hopper to said platform so that the vibration of said hopper by said platform induces amplified vibration of said resilient member and therefore of the upper portion of said hopper.

CLAUDE W. JOHNSON.

References Cited in the file of this patent

UNITED STATES PATENTS

| Number | Name | Date |
| --- | --- | --- |
| 1,694,499 | Carlton | Dec. 11, 1928 |
| 1,823,744 | King | Sept. 15, 1931 |
| 2,257,688 | Jones | Sept. 30, 1941 |
| 2,259,795 | Brower | Oct. 21, 1941 |
| 2,274,713 | Kushera | Mar. 3, 1942 |
| 2,277,511 | Daneke | Mar. 24, 1942 |
| 2,338,133 | Sandell | Jan. 4, 1944 |
| 2,389,343 | Connor | Nov. 20, 1945 |
| 2,396,822 | Brisendine | Mar. 19, 1946 |
| 2,442,870 | Flynn | June 8, 1948 |
| 2,463,448 | Weyandt | Mar. 1, 1949 |
| 2,492,796 | Gorad et al. | Dec. 27, 1949 |
| 2,494,075 | Weyandt | Jan. 10, 1950 |
| 2,573,164 | Scheinker | Oct. 30, 1951 |

OTHER REFERENCES

Syntron Co. (catalog) Sec. 562 P. L. and R.— received in P. O. Aug. 9, 1949.